United States Patent
Davies et al.

(10) Patent No.: US 6,674,457 B1
(45) Date of Patent: Jan. 6, 2004

(54) AUDIO-VIDEO CONFERENCE SYSTEM WITH PARALLEL NETWORKS

(76) Inventors: Steven Gareth Davies, 1 Station Road Kemble, Cirencester (GB), GL7 6AT; Stephen John Roe, Greenwich Cottage, Kidmore End Reading, Berkshire (GB), RG4 9AY ( * ) Notice: Subject to any disclaimer, the term of this patent is extended or adjusted under 35 U.S.C. 154(b) by 0 days.

(21) Appl. No.: 09/890,149

(22) PCT Filed: Jan. 27, 2000

(86) PCT No.: PCT/GB00/00203
§ 371 (c)(1),
(2), (4) Date: Jul. 25, 2001

(87) PCT Pub. No.: WO00/45579
PCT Pub. Date: Aug. 3, 2000

(30) Foreign Application Priority Data

Jan. 29, 1999 (GB) .............................................. 9901859

(51) Int. Cl.⁷ .................................................. H04N 7/14
(52) U.S. Cl. ................................ 348/14.01; 348/14.12; 379/93.02
(58) Field of Search .......................... 348/14.01–14.09, 348/14.1–14.13; 379/93.05, 93.06, 100.12, 93.02; 370/260, 261, 352–354; 709/204

(56) References Cited

FOREIGN PATENT DOCUMENTS

| EP | 0691779 | 10/1996 | ............ H04M/3/56 |
| EP | 0847178 | 10/1998 | ............ H04M/3/56 |

*Primary Examiner*—Melur Ramakrishnaiah
(74) *Attorney, Agent, or Firm*—Bourque & Associates, P.A.

(57) ABSTRACT

An apparatus for communicating video frames from a source having a video input means to a destination having a visual display unit during the course of a telephone conversation. A first user can use a first computer communication means to make a first connection to a service provider. The service provider or first user then initiates a telephone call from the first to the second telephone via the service provider and the first and second communication paths. A second user can then use the second computer communication means to make a second connection to the service provider. Caller-id data is communicated between each of the first and second users and the service provider so that the service provider can correlate both the call and the first and second connections with each other. At least one video image is uploaded from the video input means to the service provider, and then downloaded to one of the computers.

12 Claims, 2 Drawing Sheets

AUDIO-VIDEO CONFERENCE SYSTEM WITH PARALLEL NETWORKS

BACKGROUND OF THE INVENTION

1. Field of the Invention

The present invention relates to a method and apparatus for communicating one or more video frames from a source having a video input means to a destination having a visual display unit during the course of a telephone conversation.

2. Related Art

Known multimedia communication terminals are integrated devices, that is, they contain both audio and video communication portions linked together with internal circuitry and/or software which synchronize audio and video digital data or analogue signals (herein referred to collectively as "signals"), and hence corresponding audible and visible output from the integrated terminal. Such synchronization is particularly desirable in order to achieve so-called "lip-synch" in audio-video telephony. In practice, for the signals to be effectively synchronized, it has been found in the broadcast industry that the visible output should lead the audible output by no more than about 20 ms, and should lag the audio signal by no more than about 40 ms.

Examples of known integrated terminals operating according to the ITU-T Recommendation H. 320 "Narrowband Visual Telephone Systems and Terminal Equipment" include those sold by PictureTel Corporation under the trade mark the Venue-2000 and those sold by VTEL Corporation under the trade mark Enterprise Series Room System TC1000. Intel Corporation sells a business video conferencing system under the product code PCVD1013ST that operates according to the H. 320 and H. 323 standards. An example of a known integrated terminal operating according to the H. 324 standard is those sold by 8×8 Inc. under. the trademark ViaTV Phone.

Such known terminals are designed to function in an audio-only mode, so that these can function as a simple telephone when communicating with anther telephony terminal.

Such integrated devices have yet to become widely adopted, and one reason for this is that whilst such devices may function as a telephone, users still need a conventional telephone for communication, for example with other telephones on the same PBX exchange, or with external telephones. Many PBX manufacturers now support ISDN lines to the desktop for the provision of multimedia communication terminals, according to the H. 320 standard. Unfortunately, different manufacturers provide different levels of functionality (for example, features such as call hold, call transfer and call forward), not all of which are supported by multimedia terminals. Again, the result is the need to have more than one telephony device on a desktop.

Most users therefore end up with two telephony devices on their desktop. This is inconvenient, owing to the extra desktop space normally required, as well as the need to have a different telephone number for each device. Callers must therefore keep track of two numbers, and decide in advance which type of call. they intend to place.

The recent emergence of the H. 323 standard for multimedia communications over packet networks, for example local area networks (LANs) using the Internet Protocol over Ethernet, has added further complications for the user, because the multimedia terminal must then in most cases connect to the data network, rather than the telephony network. It is well known that the typical data network is not as resilient or reliable as the telephony network. Many H. 323 multimedia terminals are PC based, the user rightly fears losing his telephony facility when the LAN or his PC crashes or fails. Therefore, the user still needs more than one telephony device.

Furthermore, a critical mass of audio-video equipment does not yet exist. Users and potential users of audio-video telephony are therefore unable to communicate using audio-video telephony with a large number of people whom they may call. This further inhibits the adoption of audio-video telephony.

Another problem concerns security arrangements such as firewalls for computers on data networks, for example LAN's and Intranets, in order to prevent unauthorized data from entering or leaving the network. Although firewalls generally permit activities such as the receipt and sending of e-mail messages or the browsing of web pages, these firewalls are not normally compatible with packet-based audio-video communication using the data network such as those conforming to H. 323 or SIP (Session Initiation Protocol). Therefore, even if two users had the requisite audio-video terminals, they would not be able to communicate if on opposite sides of the firewall. Although special firewalls (e.g. H. 323) can in principle be used to allow such communication, network managers may be unwilling to invest in such special equipment simply because the demand for audio-video communication is too low.

SUMMARY OF THE INVENTION

It is an object of the present invention to provide a more convenient audio and video communication method and system in cases where it is not necessary for video to be synchronised with the audio in the course of an audio-video telephone call so that both parties need not be equipped with fully capable multimedia terminals.

According to the invention, there is provided a method of making an audio-video telephone call using an audio and video communication system that comprises: a first telephony device and a second telephony device that may communicate with each other over a telephony communications network; an audio-video service provider that may communicate over said telephony communications network with both the first and second telephony devices respectively along a first communication path and a second communication path; a first computer and a second computer, said computers being in proximity with respectively the first telephony device and the second telephony device, at least one of the computers having a video input means and the first computer and second computer each having a data input means, a visual display unit, and communication, means by which the first computer and second computer may make a connection to the service provider respectively along a third communication path and a fourth communication path; in which the first telephony device and first computer are operable by a first user and the second telephony device and second computer are operable by a second user, wherein the method comprises the steps of:

a) using the first computer communication means to make a first connection to the service provider;

b) initiating an audio telephone call between the first telephony device and the second telephony device via the service provider and the first and second communication paths;

c) communicating caller-id data between the first user and the service provider along the first communication path and/or the third communication path so that the service provider can correlate both the call and the first connection with each other;

d) using the second computer communication means to make a second connection to the service provider;

e) communicating an access code from the service provider to the first user, and then communicating in the audio telephone call said access code from the first user to the second user;

f) communicating said access code between the second user and the service provider along at least the fourth communication path so that the service provider can correlate both the call and the second connection with each other;

g) uploading at least one video image from the video input means to the service provider;

h) downloading said video image(s) from the service provider to the first computer and/or second computer to be displayed on the respective video display unit(s) when the second user has answered said telephone call and when both the first and second connections are correlated with the call.

The video image(s) may be uploaded and/or downloaded via the third communication path and/or the fourth communication path. If the communication means includes means by which the first computer and second computer may make a connection to the service provider respectively along a fifth communication path and a sixth communication path, the method may comprise the steps of:

i) communicating to the service provider the video communication capabilities of the first computer and/or second computer;

j) making a connection between the service provider and the first computer and/or between the service provider and the second computer along the fifth communication path and/or the sixth communication path;

k) uploading at least one video image from the video input means to the service provider along the fifth communication path and/or sixth communication path; and/or downloading at least one video image from the service provider along the fifth communication path and/or sixth communication path to be displayed on the respective video display unit(s).

The term "telephony device" as used herein means any device that can be used for speech telephony and the term "telephony communications network" means any communications network that can be used to carry speech telephony signals. In the basic embodiment of the invention the telephony device is a simple telephone and the telephony communications network is the Public Switched Telephone Network (PSTN) or the Mobile Network. In other embodiments of the invention, the telephony device may be a LAN based telephone or a sound card, microphone and headset in a PC, and the telephony communications network may be the data network. Also the telephony device may even be part of a multimedia terminal. However, for the purposes of this document "telephone" is used to mean "telephony device" in the broadest sense, and likewise "telephone network" is used to mean "telephony communications network" in the broadest sense.

Likewise, the placement of the telephone call (routed) 'via the service provider' is also meant in the broadest sense. The service provider may indeed terminate both legs (first and second communication paths) of the telephone call and route the audio through its own equipment. In this case the first and second communication paths carry call signalling information and also speech. This may be the case, for, example, when the service provider requires the first user to enter caller-id data via their telephone keypad. Alternatively, the service,provider may just have knowledge of the telephone call between the first and second user. In this case the service provider has notification or signalling interfaces to/from the telephony communications network and the first and second communication paths carry only signalling information, and the audio media travels directly through the telephone communications network between the telephony devices. Examples of such signalling interfaces includes computer telephony integration (CTI). interfaces to PBX's, and interfaces to the Intelligent Network (IN) in the PSTN. When the telephony network is an H. 323 packet network, such a signalling interface can be provided through the GateKeeper interface for example.

The term "multimedia terminal" as used herein means any device or collection of devices used for audio video and optionally data communications. The multimedia terminal may be formed from separate audio and video communication devices, for example a telephone and a video display unit of a personal computer optionally equipped with a camera and capture card. Alternatively, the multimedia terminal may be formed from the combination of an integrated multimedia terminal having both audio and video capability, but using only the video function, in combination with a separate audio device, for example a telephone. Finally the multimedia terminal may be an integrated multimedia device.

The term "caller-id data" as used herein means any type of data or information that serves to identify the first or the second user, the association between their telephony devices and their computers, and/or their calls and connections. Examples of caller-id data include telephone numbers, computer network addresses and access codes, including security codes and account codes.

Either user may communicate their telephone numbers and their computer network addresses on their computer connections (third and fourth communication paths), and the service provider may make the association with their telephones, either by calling the telephones using the previously inputted telephone number or by matching the telephone number presented by the telephony communications network (Calling Line Identifier and Called Party Number services) against the previously inputted telephone numbers.

When the service provider cannot immediately associate a user's telephone device and computer and the corresponding calls and connections (because, for example the user's telephone number has not been presented by the network and/or there is no computer connection), the use of access codes may serve as caller-id data. The service provider may require the use of access codes for security or billing purposes in addition to other forms of caller-id data. For example, the service provider may require the first user to enter an access code (e.g. account number and/or PIN) before allowing the telephony call to the second user to proceed. The access code entered will identify the first user to the service provider and allow the correlation with his computer to be made provided his computer connection is also made to the service provider. Another example of caller-id data includes an access code communicated from the service provider to the first user along the third communication path as a series of numbers, letters or other symbols displayed upon the first computer visual display unit. The first user could then communicate these symbols back to the service provider along the first communication path, for example by using a touch tone key pad associated with the telephone, or if the service provider has voice recognition means, by speaking the access code back to the service provider.

In the basic embodiment of the invention, the first user initiates the telephone call to the second user from his telephony device. This need not always be the case. The invention is also applicable when the second user initiates the telephone call from his telephony device to the first user. Likewise, in a more sophisticated embodiment of the invention, the first user may initiate the telephone call from his computer along the third communication path. Caller-id data may contain his telephone number as well as the telephone number of the second user. The service provider may then place telephone calls out to both first and second users along the first and second communication paths connecting their telephony devices together.

Because the telephone call to the second user is routed via the service provider, association of calls and connections may conveniently take place during the initiation of the telephone call, before the call has been forwarded to or, answered by the second user. Then, by the time the second user has answered the telephone call, the service provider has already associated the connection to the first user's computer with the telephone call.

Images can then be uploaded from the first user's computer to the service provider.

The caller-id data communicated between the second user and the service provider includes caller-id data communicated by the first user to,the second user. For example, once the call has been answered, the first user may then communicate verbally to the second user the same access code. The second user can then use his computer to make a connection to the service provider, enter the access code, for example via a computer keyboard, in order to be able to download one or more images already uploaded to the service provider.

If the caller-id data is sufficient to identify the second user and make, the correlation between his telephone device and computer immediately, without further input from him, then the service provider can automate the downloading of images to his computer once the telephone call has been answered.

Preferably, such video images are automatically downloaded at frequent intervals in order to approximate real time video. Indeed, it is the function of the audio-video service to provide the highest level of video communication consistent with the user's computer video capability. For example, if both first and second user do indeed have fully functional multimedia terminals then real-time video communication may be possible. If one user has no camera, for example, but does have a video decoder on his PC, then only one-way video communication may take place.

The video communication capabilities of a user computer may already be known from subscription and log-in parameters or may be determined dynamically through the execution of an applet on the user computer that communicates with the service provider. The eventual level of video communication will also be affected by the action of any firewall and the amount of bandwidth available.

In a basic embodiment of the invention, said video images are downloaded manually by the first and/or second user, for example by activating a refresh or reload function in web-browser software. In some cases, this may be the highest level of video capability that can be achieved because of firewalls or because one user has no video camera and/or video codec installed. In this case video is sent and/or received on the third and/or fourth communication paths, that is, the same communication paths that are used for data communications between the user's computers and the service provider.

Where firewalls may need to be bypassed and/or more bandwidth needed for improved video communications, additional communication paths, a fifth communication path and a sixth path may be provided between the user's computer and the service provider. The fifth and sixth paths are intrinsically associated with the third and fourth communication paths.

Where there are mechanisms for transferring such media through firewalls and/or sufficient bandwidth is available then the fifth and sixth communication paths may be on the same or different physical circuits as the third and fourth communication paths.

Therefore, the system may be capable of permitting the service provider to determine the video communication capabilities of the first computer and/or second computer for example via an applet received from the service provider by the first or second computers, or through subscriber login parameters, in order to provide a higher quality of video communication consistent with these capabilities and any restrictions imposed by firewalls and/or the availability of bandwidth That is, the method and system according to the invention are consistent with fully functional multimedia terminals when firewalls are avoided (for example by connecting via access routers over the PSTN or other suitable networks) or where mechanisms to route such traffic through firewalls exist.

In all cases, it is preferred if images can no longer be downloaded when the telephone call is ended. This provides a degree of security against unauthorised downloading of such images.

In the above example, the caller-id data at all stages is the same. This need not be the case, however, and caller-id data at each stage can be different as long as the service provider is able to make the necessary correlations.

In the above description, the initiation of the video element of the call is instigated by the first user (i.e. the user who has initiated the telephone call). This need not be the case. The second user or the user receiving the telephone call may instead instigate the uploading and downloading of video images, particularly if the second user has video input equipment. The system and methods described above apply equally in this case.

In one embodiment of the invention, the connection for the first computer and/or the second computer is made through the Internet. In this case, the communication means includes web-browser software, the downloading and/or the uploading of said image being from/to a web page.

Alternatively, the connection for the first computer and/or the second computer may be made directly to the service provider through the public switched telephone network or other suitable networks, for example via an access router either connected directly to the computer, or-via a local area network. Such an access router can therefore bypass any firewalls on the local network, but may be programmed only to dial into the service provider which can then be provided with its own firewall in order to safeguard the network. Such a direct connection can provide the benefit of a higher data rate than may be achievable over the Internet, in order to provide quick transmission of images.

In a more sophisticated embodiment of the invention, the connection for the first computer and/or the second computer may use both the Internet and the PSTN—the Internet for data communication and the PSTN for video communication.

The invention is also applicable to future networks that provided high bandwidth Internet connection, for example those using Cable Modem or DSL/ATM technologies. Provided mechanisms exist for passing such traffic through firewalls (if they are present), these Internet connections may be used for both data communication, video communication and even audio communication.

Alternatively, if both parties in a call belong to the same corporate organisation, the enterprise's Intranet and/or LAN made be used for the video communication paths.

The telephony communications network will in general comprise the Public Switched Telephone Network. The telephone network may also or alternatively comprise a local private telephone network, for example a PBX network, or the mobile network. Future telephony communications networks may also use the data network such as an Intranet or LAN, or future Internet networks.

In one embodiment of the invention, the caller-id data between the first user and service provider is communicated over both the first communication path and the third communication path to the service provider, rather than from the service provider.

Alternatively, the caller-id data between the first user and service provider may be communicated over the third communication path from the service provider to the first user, and over the first communication path from the first user to the service provider.

In a preferred embodiment of the invention, the service provider receives via the telephone network- caller-id data including the telephone number of the first telephone. Such caller-id data may be typed into a touch tone telephone by the first user, but most conveniently this caller-id data is generated automatically by the telephone network when the first user makes the telephone call.

Alternatively, the service provider may call the first telephony device using information supplied by the first user over the third communication path or from previously supplied subscriber or log-in information. The service provider may additionally call the second user when the information supplied by the first user over the third communication path also includes the telephone number of the second user.

Similarly, the caller-id data communicated between the second user and the service provider may include the telephone number of the second telephone.

If the service provider comprises computerised voice recognition means, at least some of such caller-id data may be communicated to the service provider by voice. Alternatively or additionally, if a telephone has a touch tone keypad and the service provider has tone recognition means, this may be used to communicate at least some of the caller-id data to the service provider.

When the data input means comprises a keyboard or a computer mouse, at least some of such caller-id data may be communicated to the service provider with the keyboard or mouse.

BRIEF DESCRIPTION OF THE DRAWINGS

The invention will now be described by way of example with reference to the accompanying drawings, in which.

DETAILED DESCRIPTION

Figure 1:
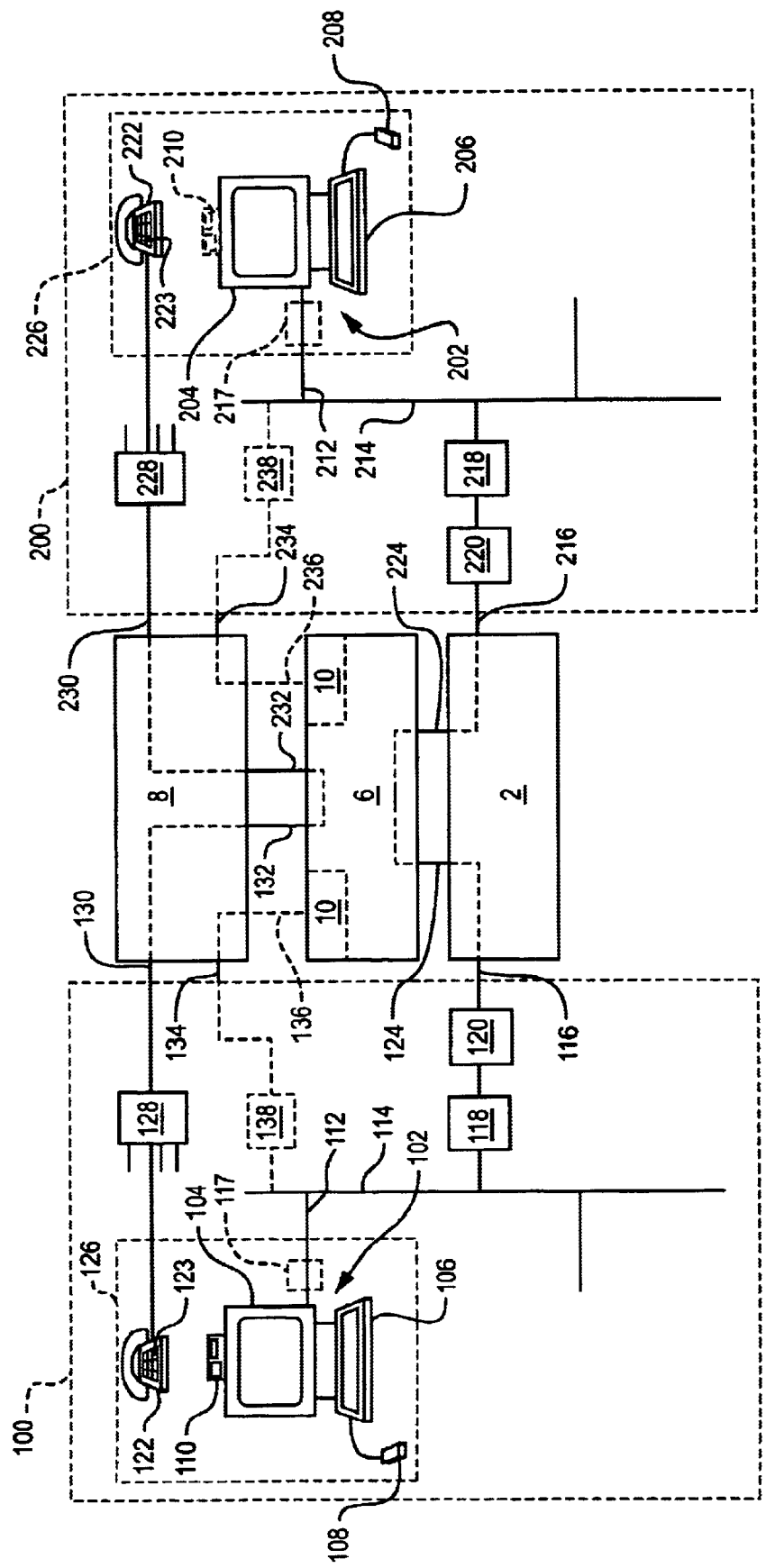
FIG. 1 is a schematic block diagram of a preferred embodiment of an audio and video communication system according to the invention.

In FIG. 1, an audio and video communications system 1 has at a first location 100 one or more personal computers 102, each comprising a visual display unit, or monitor, 104 and data input means in the form of a keyboard 106 and a mouse 108. Seated near the computer 102, and most conveniently atop the monitor 104, is a conventional video camera 110 by which one or more video images may be captured by the computer. Each computer 102 may be connected 112 to a local area network (LAN) 114, however, the invention is not limited to computers on LANs and is applicable also to stand-alone computers.

Each computer 102 may via the LAN 114 connect 116 to the Internet 2 through a conventional firewall 118 and router 120. In the case of a stand-alone computer, the connection 116 may be via a modem 117, shown in dashed outline.

Conventional web-browser software and/or client software. running in the personal computer 102 permits the user of the computer to connect 124 via the Internet 2 to an audio-video service provider 6 along a path referred to herein as a third communication path.

Also at the first location is at. least one telephone 122 with a touch tone key pad 123 in proximity 126 with the personal computer 102. The telephone 122 may be any type of telephone, including a fixed telephone connected 130 to a telephone network, for example the public switched telephone network (PSTN) 8, either directly or through a local private telephone network, for example a private branch exchange (PBX) 128, or a mobile (i.e. cellular) telephone connected to the PSTN 8 via a wireless network or a fixed telephone connected to a data network (not shown). The user of the telephone 122 may then dial through 132 to the audio-video service provider 6 via the PSTN 8 along a path referred to herein as a first communication path.

The computer 102 and telephone 122 are in proximity 126 with each other in the sense that a user of the telephone may at some point in the process or setting up or having an audio-video telephone call, operate the data input means 106,108, view the monitor 104, or have his or some other image captured by the video camera 110.

The data rate achievable between the computer 102 and the audio-video service provider 6 through the Internet 2 may be relatively low for the transmission of video images. This may not be a problem for the transmission of just one still image, or a series of separate still images. If greater data rate is desired, then a connection 134,136 may be made through the PSTN 8, or other suitable networks, to the audio-video service provider 6 via a conventional access router 138. If this way of connecting bypasses conventional firewalls, the access router 138 should then be limited to connecting through to secure sites such as the service provider 8, which would then normally be required to have their own internal firewall 10. The connection via the access router 138 is therefore suitable if a plurality of video images are to be automatically uploaded (or downloaded) at frequent intervals in order to approximate real time video. In, the future, users will have access to high-speed Internet access suitable for the transmission of a plurality of images. In this case, and if mechanisms exist, to pass such traffic through firewalls (if present) and Internet routers, then data, access to the service provider can be solely via the Internet 2.

The connection through the access router may be the initial connection made between the user and the service provider 6, in which case this connection is made along the third communication path. It is possible however, that this connection is made subsequent to a connection made through the Internet 2, in which case this connection is made along a path referred to herein as a fifth communication path.

For example, the service provider 6 may send an applet to the user's computer 102 in order to determine the video capability of the computer. If the service provider. 6 is aware of the connection to the computer 102 via the access router 138, then the service provider can dial up an additional communications channel to the computer 102 via the access router 138. Video images may then be uploaded (or downloaded) from the service provider via the access router 138. Where, high-speed Internet access is available, the fifth and/or sixth communication path may take the same physical route as the third and/or fourth communication paths respectively.

The arrangement described above allows a user at the first location 100 to make an audio-video telephone call to a second user at a second location 200. The second location 200 has telephone and computer apparatus as described above for the first location 100. The telephone and computer apparatus and connections associated with the second location 200 are therefore labelled with similar reference numeral incremented by 100.

The telephone and computer apparatus may connect to the audio-video service provider 6 in a similar manner to that described above for the first location 100, along paths referred to herein respectively as second and fourth communication paths. If the second computer makes a subsequent connection with the service provider, for example through the access router 238, then this connection is via a path referred to herein as a sixth communication path.

The second location, however, does not need to have a video camera 210, which is therefore drawn in phantom. If the second location does have a video camera 210, then it becomes possible for the first and second users both to receive video images from the other.

Figure 2:
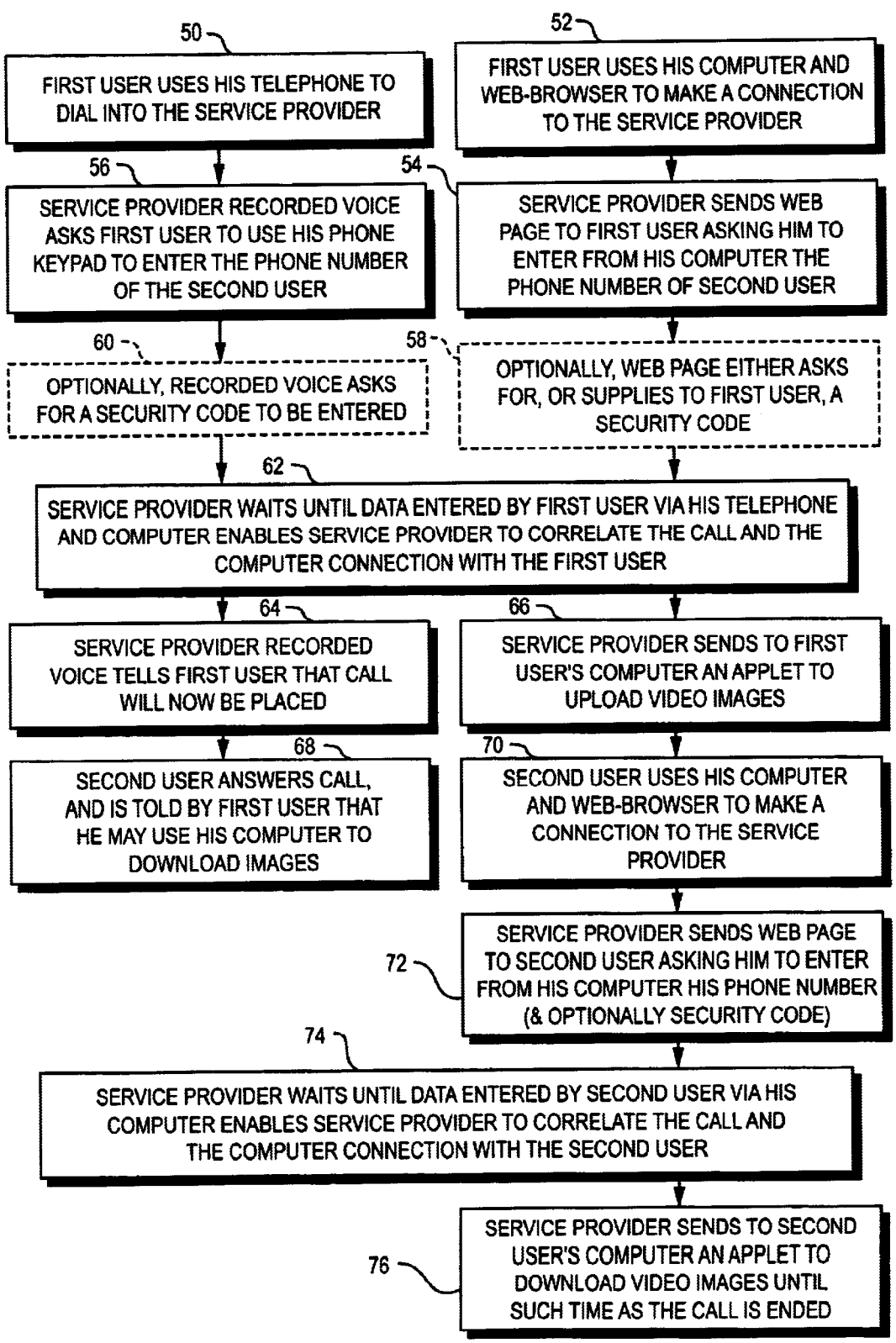
FIG. 2 is a flow diagram. explaining a method of making an audio-video telephone call according to the invention.

Reference is now made also to FIG. 2, which shows the process involved in making an audio-video telephone call between the first location 100 and the second location 200. The first user begins the process by using his telephone 122 to call 50 the service provider and to use his computer 102 and web-browser software to make a connection 52 to the service provider 6. At this stage, the service provider has no way of correlating the telephone call with the computer connection.

There are many different ways in which caller-id data may be exchanged between the first user and the service provider. The flow chart of FIG. 2 relates just to one possible way of making the correlation.

The service provider 6 sends 54 a web page to the first user's computer asking him to enter from his computer, for example by typing information into his keyboard 106, the phone number of the second user. Additionally or alternatively, the user will hear 56 a recorded voice message from the service provider 6 asking him to key into his telephone the telephone number of the second user.

Optionally, the process may involve the exchange of a security code, or an account code. Such a code may also be associated with billing of the first user for the service provided by the service provider, in which case, the first user may enter 58 via his computer a unique code identifying the user. If the same code is entered 60 by telephone, then it may not be necessary to enter the telephone number also via the computer.

The service provider 6 may be handling simultaneously many different calls and computer connections, and so the service provider waits 62 until it is able to make a match between the caller-id data associated with the connection and call with the first user. When a match is made, the service provider 6 is able to correlate the call the with the connection.

At this point, the user may hear 64 on his telephone a recorded voice saying the call to the second user will now be placed. At about the same time, the service provider 6 sends to the first computer 102 an applet so that it can determine the video conferencing capabilities of the first computer and if necessary have the first computer upload 66 one or more video images to the service provider 6 from the video camera 110.

When the second user answers the call at his telephone 222, he is told by the first user that he may make a connection from his computer 202 to the service provider 6 in order to download one or more of the video images that have or will be uploaded from the first user to the service provider 6. The second user then uses 70 his computer 202 and web-browser software to make a connection to the service provider.

At this stage, the service provider has no way of correlating the telephone call with the computer connection to the second computer 202. Again, there are many different ways in which caller-id data may be exchanged between the second user and the service provider. It is, however, necessary for at least some of the exchange with the second user to be with the second user's computer 202.

One way in which caller-id data may be exchanged is if the service provider sends 72 a web page to the second user's computer 202 asking the second user to enter his telephone number. Optionally, the second user may also be asked for a security or access code. This code could be the same code originally used by the first user, in which case the first user will have communicated this to the second user. However, if the code is associated with billing of the first user, it may be desirable for the second user to be supplied with a different code.

The service provider waits 74 until it is able to make a match between the caller-id data associated with the connection to the second computer 202 and the call now set up between the first and second users. When a match is made, the service provider 6 is able to correlate the call with connection to the second user.

The service provider 6 then sends to the second computer 202 an applet to determine the video conferencing capabilities of the second computer and so that the second computer is able to download 76 automatically, for example from a web page to which the second user has been granted access, one or more of the video images from the service provider 6. When the call is ended, the service provider terminates the uploading and downloading of images.

It is not, however, necessary for the second user's computer 202 to receive an applet, as the second user may be granted access to web pages, so that he may manually download one or more images. Alternatively for fully functional video conferencing computers, proper video communication whether via the service provider or direct may be established if firewalls and bandwidth allow.

There are many alternative possibilities for the exchange of caller-id data and the correlation of telephone call with a computer connection.

For example, it is not necessary for the caller-id data to comprise the telephone number of the second user. The service provider 6 may send to the first user's computer 102 a security code or uniquely generated access code, which the user then types into his telephone keypad after he has called the service provider.

Many telephone network automatically transmit the telephone number of the person making the call. This number may be intercepted by the service provider, and form part of the caller-id data. In this case it may not be necessary for the first user to enter any other caller-id data via his telephone, but just to supply additional caller-id data to the service provider from his computer, for example, by entering his telephone number from his computer.

Another method is for the service provider to have many telephone numbers, reserve one for this call and prompt the user via a web page to call this reserved number. Conversely, the service provider may in fact call the first user's telephone after he has entered its telephone number (or confirmed it) via a web page.

Similarly, since the service provider is supplied with the telephone number of the second user at the time the call is made, the caller-id data communicated between the second user and the service provider may include the telephone number of the second telephone.

If the second user also has a video camera 210, then each computer may alternate between uploading and downloading images to each computer, so that both the first and second users may view one or more images from the other user's video camera. Indeed, if both user's computers also have video codecs, then the service provider can facilitate a better quality of service approaching real-time video communication subject to the available bandwidth and firewall restrictions.

The audio and video communications system described above permits an audio-video call to be placed without the need for fully functioning multimedia terminals at each end of the call, though it can be consistently applied to such fully functional terminals. The system takes advantage of the common arrangement of a stand-alone or networked personal computer in proximity with a conventional telephone on a different network. Voice communication may take place over standard telephone lines, whilst one or more video images may be received by at least one of the parties to the call. The invention may also help provide a level of audio and video communications consistent with the capabilities of the user's terminals and the networks to which they are connected. The system therefore facilitates the adoption of audio-video telephony.

It is to be recognized that various alterations, modifications, and/or additions may be introduced into the constructions and arrangements of parts described above without departing from the spirit or ambit of the present invention.

What is claimed is:

1. A method, of making an audio-video telephone call using an audio and video communication system (1) that comprises: a first telephony device (122) and a second telephony device (222) that may communicate with each other over a telephony communications network (8); an audio-video service provider (6) that may communicate over said telephony communications network (8) with both the first and second telephony devices (122,222) respectively along a first communication path (130,132) and a second communication path (230,232); a first computer (102) and a second computer (202), said computers (102,202) being in proximity with respectively the first telephony device (122) and the second telephony device (222), at least one of the computers (102,202) having a video input means (110) and the first computer (102) and second computer (202) each having a data input means (106,108;206,208), a visual display unit (104,204), and communication means (112, 117;212,217) by which the first computer (102) and second computer (202) may make a connection to the service provider (6) respectively along a third communication path (116,124) and a fourth communication path (216,224); in which the first telephony device (122) and first computer (102) are operable by a first user and the second telephony device (222) and second computer (202) are operable by a second user, wherein the method comprises the steps of:

a) using the first computer communication means (112, 117) to make a first connection to the service provider (6);

b) initiating an audio telephone call between the first telephony device (122) and the second telephony device (222) via the service provider (6) and the first and second communication paths (130,132;230,232);

c) communicating caller-id data between the first user and the service provider (6) along the first communication path (130,132) and/or the third communication path (116,124) so that the service provider (6) can correlate both the call and the first connection with each other;

d) using the second computer communication means (212,217) to make a second connection to the service provider (6);

e) communicating an access code from the service provider to the first user, and then communicating in the audio telephone call said access code from the first user to the second user;

f) communicating said access code between the second user and the service provider (6) along at least the fourth communication path (216,224) so that the service provider (6) can correlate both the call and the second connection with each other;

g) uploading at least one video image from the video input means (110) to the service provider (6);

h) downloading said video image(s) from the service provider (6) to the first computer (102) and/or second computer (202) to be displayed on the respective video display unit(s) (104,204) when the second user has answered said telephone call and when both the first and second connections are correlated with the call.

2. A method of making an audio-video telephone call as claimed in claim 1, in which the access code is communicated from the service provider to the first user along the third communication path as a series of numbers, letters or other symbols displayed upon the first computer visual display unit.

3. A method of making an audio-video telephone call as claimed in claim 1, in which the access code is uniquely generated.

4. A method of making an audio-video telephone call as claimed in claim 1, in which the video image(s) is/are uploaded and/or downloaded via the third communication path (116,124) and/or the fourth communication path (216, 224).

5. A method of making an audio-video telephone call as claimed in claim 1, in which the communication means (112,117;212;217) includes means by which the first computer (102) and second computer (202) may make a connection to the service provider (6) respectively along a fifth communication path (134,136) and a sixth communication path (234,236), wherein the method comprises the steps of:

i) communicating to the service provider (6) the video communication capabilities of the first computer (102) and/or second computer (202);

j) making a connection between the service provider (6) and the first computer (102) and/or between the service provider (6) and the second computer (202) along the fifth communication path (134,136) and/or the sixth communication path (234,236);

k) uploading at least one video image from the video input means (110) to the service provider (6) along the fifth communication path (134,136) and/or sixth communication path (234,236); and/or downloading at least one video image from the service provider (6) along the fifth communication (134,136) path and/or sixth communication (234,236) path to be displayed on the respective video display unit(s) (104,204).

6. A method of making an audio-video telephone call as claimed in claim 1, in which the caller-id data between the first user and service provider (6) is communicated over both the first communication path (130,132) and the third communication path (230,232) to the service provider (6).

7. A method of making an audio-video telephone call as claimed in claim 1, in which the service provider (6) receives via the telephony network (8) caller-id data including the telephone number of the first telephony device (122).

8. A method of making an audio-video telephone call as claimed in claim 1, in which the service provider (6) comprises computerised voice and/or tone recognition means, the first user and/or the second user communicating to the service provider (6) at least some the caller-id data by voice and/or tones.

9. A method of making an audio-video telephone call as claimed in claim 1, in which images can no longer be downloaded when the telephone call is ended.

10. A method of making an audio-video telephone call as claimed in claim 1, in which the first user initiates the telephone call from the first telephony device (122) along the first communication path (130,132).

11. A method of making an audio-video telephone call as claimed in claim 1, in which the second user initiates the telephone call from the second telephony device (222) along the second communication path (230,232).

12. A method of making an audio-video telephone call as claimed in claim 1, in which the first user initiates the telephone call from the first computer (102) along the third communication path (116,124).

* * * * *